US011423158B2

(12) United States Patent
Borlick et al.

(10) Patent No.: US 11,423,158 B2
(45) Date of Patent: Aug. 23, 2022

(54) DYNAMIC COMPRESSION WITH DYNAMIC MULTI-STAGE ENCRYPTION FOR A DATA STORAGE SYSTEM

(71) Applicant: INTERNATIONAL BUSINESS MACHINES CORPORATION, Armonk, NY (US)

(72) Inventors: Matthew G. Borlick, Tucson, AZ (US); Alistair Leask Symon, Tucson, AZ (US); Micah Robison, Tucson, AZ (US); Brian Anthony Rinaldi, Tucson, AZ (US); Lokesh M. Gupta, Tucson, AZ (US); Mark Elliott Hack, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 275 days.

(21) Appl. No.: 16/569,230

(22) Filed: Sep. 12, 2019

(65) Prior Publication Data

US 2021/0081544 A1  Mar. 18, 2021

(51) Int. Cl.
*G06F 21/00* (2013.01)
*G06F 21/60* (2013.01)
(Continued)

(52) U.S. Cl.
CPC ........ *G06F 21/602* (2013.01); *G06F 12/0646* (2013.01); *H03M 7/3091* (2013.01); *G06F 2212/1052* (2013.01)

(58) Field of Classification Search
CPC . H04L 9/00; H04L 29/06; H04L 63/04; H04L 63/166; H04L 63/0428;
(Continued)

(56) References Cited

U.S. PATENT DOCUMENTS 9,069,776 B1 * 6/2015 Taropa .................... G06F 16/11
9,606,870 B1    3/2017 Meiri et al.
(Continued)

FOREIGN PATENT DOCUMENTS

WO    2009132144 A2    10/2009

OTHER PUBLICATIONS

Zhou et al., "On the design of an efficient encryption-then-compression system", 2013 IEEE International Conference on Acoustics, Speech and Signal Processing, Date of Conference: May 26-31 (Year: 2013).*

(Continued)

*Primary Examiner* — Morshed Mehedi
(74) *Attorney, Agent, or Firm* — Konrad, Raynes, Davda & Victor LLP; William K. Konrad

(57) ABSTRACT

Dynamic compression with dynamic multi-stage encryption for a data storage system in accordance with the present description includes, in one aspect of the present description, preserves end-to-end encryption between a host and a storage controller while compressing data which was received from the host in encrypted but uncompressed form, using MIPs and other processing resources of the storage controller instead of the host. In one embodiment, the storage controller decrypts encrypted but uncompressed data received from the host to unencrypted data and compresses the unencrypted data to compressed data. The storage controller then encrypts the compressed data to encrypted, compressed data and stores the encrypted, compressed data in a storage device controlled by the storage controller. Other aspects and advantages may be realized, depending upon the particular application.

21 Claims, 8 Drawing Sheets

(51) Int. Cl.
*H03M 7/30* (2006.01)
*G06F 12/06* (2006.01)

(58) Field of Classification Search
CPC ..... H04L 65/60; H04L 65/604; H04L 65/607; H04L 67/04; H04L 67/10; H04L 67/28; H04L 67/2804; H04L 69/04; G06F 3/067; G06F 3/0608; G06F 3/0652; G06F 12/0646; G06F 16/10; G06F 16/48; G06F 16/113; G06F 16/116; G06F 21/60; G06F 21/602; G06F 21/6218; G06F 2212/1052; H03M 7/3091; G11B 20/00855
See application file for complete search history.

(56) References Cited

U.S. PATENT DOCUMENTS

| | | | |
|---|---|---|---|
| 9,990,352 B2 | 6/2018 | Tripathy et al. | |
| 10,133,505 B1 * | 11/2018 | LeCrone | G06F 3/0673 |
| 2016/0292446 A1 | 10/2016 | Lawrence et al. | |
| 2017/0285960 A1 | 10/2017 | Yap et al. | |
| 2019/0065788 A1 | 2/2019 | Vijayasankar et al. | |
| 2019/0097789 A1 * | 3/2019 | Rangayyan | G06F 21/606 |

OTHER PUBLICATIONS

Johnson, et al., "On Compressing Encrypted Data" [online] http://citeseerx.ist.psu.edu/viewdoc/download?doi=10.1.1.94.6515&rep=rep1&type=pdf, pp. 34.

Wikipedia, "Data deduplication" [online][retrieved Aug. 1, 2019] http://en.wikipedia.org/wiki/Data_deduplilcation, pp. 6.

Wikipedia, "Data erasure" [online][retrieved Aug. 18, 2019] http://en.wikipedia.org/wiki/Data_erasure, pp. 9.

* cited by examiner under sized DYNAMIC COMPRESSION WITH DYNAMIC MULTI-STAGE ENCRYPTION FOR A DATA STORAGE SYSTEM

BACKGROUND OF THE INVENTION

1. Field of the Invention

The present invention relates to a computer program product, system, and method for dynamic compression with dynamic multi-stage encryption for a data storage system.

2. Description of the Related Art

A storage system typically includes a storage controller and one or more data storage devices such as hard disk drives, solid state drives, tape drives, etc. The storage system is often connected to a host which hosts applications which issue input/output instructions or commands for writing data to or reading data from a storage subunit or domain such as a volume, for example.

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Data from a host to be stored in the data storage system is typically directed to a primary data storage device at a local site and then replicated to one or more secondary data storage devices which may be geographically remote from the primary data storage device.

To protect the security of data stored by a data storage device, the data is frequently encrypted by the host using an encryption key provided by a key management server in accordance with a suitable messaging protocol such as, for example, the Key Management Interoperability Protocol (KMIP). Keys may be created on a server and then retrieved, in accordance with the KMIP or other suitable key management protocol.

In "end-to-end" encryption, the data is encrypted by the host before it is sent to the storage controller and is encrypted when it is stored by the storage controller. As a result, the data is always encrypted as it is transferred from the host to the storage controller in a write operation and is encrypted as it is stored and then transferred from the storage controller back to the host in a read operation. In this manner, unauthorized access to the data may be substantially prevented by the end-to-end encryption of the data.

Prior to encrypting data to be sent to a storage controller for storage, the host may first compress the data to preserve storage space in the storage devices. Various compression algorithms such as LZ77 and LZ78 can achieve a substantial reduction in size of the data to be stored. In general, compression algorithms identify redundant data inside data units such as individual files, and encode this redundant data more efficiently. However, data reduction by compression can consume considerable processing resources of the host and may slow input/output operations. One example of such processing resources consumed by data compression and by input/output operations may be measured in Million Instructions Per Second (MIPs), for example. Thus, to avoid excessive depletion of a MIPs resource by data compression, the host may opt to bypass compression prior to encrypting the data to maintain a sufficient level of input/output operations directed to the storage controller.

Moreover, once the data is encrypted and sent to the storage controller for storage, attempts to then compress the encrypted data received from the host to a smaller data size may not be satisfactory. For example, the reduction in storage space achieved by compressing encrypted data may be insufficient to justify consuming processing resources at the storage controller to attempt to compress encrypted data. As a result, encrypted data is frequently stored as uncompressed, encrypted data, consuming substantial storage resources as compared to data which has been both compressed and encrypted by the host prior to transmitting the compressed, encrypted data to the storage controller for storage.

Other known data size reduction techniques include data deduplication which can reduce overall data storage requirements by reducing or eliminating duplicate copies of blocks of data, for example. This technique may also be applied to network data transfers to reduce the number of bytes that must be sent. In a typical deduplication process, unique blocks or chunks of data, or byte patterns, are identified and stored. Other blocks of data are compared to stored copies and if a match occurs, the redundant block is replaced with a pointer or other reference that points to the stored block. Deduplication may be paired with data compression for additional storage or bandwidth savings. Deduplication is typically applied first to eliminate large chunks or blocks of repetitive data, and compression may then be applied to more efficiently encode each of the blocks to be stored or transmitted for storage.

SUMMARY

Dynamic compression with dynamic multi-stage encryption for a data storage system in accordance with one embodiment of the present description includes a host transferring encrypted data to a storage controller controlling a storage device, and the storage controller: decrypting the encrypted data to unencrypted data, compressing the unencrypted data to compressed data, encrypting the compressed data to encrypted, compressed data, and storing the encrypted, compressed data in the storage device. In one aspect, the decrypting the encrypted data to unencrypted data includes decrypting the encrypted data to unencrypted data in a volatile memory area of the storage controller and securely erasing the volatile memory area in a secure data overwrite process to ensure erasure of unencrypted data resultant from the decrypting.

In another aspect, the storage controller receives a compression status flag associated with the encrypted data from the host, and determines as a function of a state of the compression status flag whether to decrypt, compress and encrypt again, the encrypted data received from the host and associated with the compression status flag. In one embodiment, the compression status flag has a state which indicates at least one of whether encrypted data received from the host and associated with the compression status flag is 1) compressed, and 2) compressible.

In still another aspect, the host determines as a function of a comparison of available resources of the host and the storage controller, whether to compress unencrypted data at the host prior to encrypting and transferring encrypted data to the storage controller, and whether to bypass compressing unencrypted data at the host prior to encrypting and transferring encrypted data to the storage controller.

In yet another aspect, the storage controller receives a read request from a host to read encrypted data stored in the storage device, transfers encrypted read data from the storage device to the storage controller, determines whether the encrypted read data read from the storage device has been compressed. If so, the storage controller decrypts the encrypted read data to unencrypted read data, de-compresses the unencrypted read data to uncompressed read data, encrypts the uncompressed read data to encrypted, uncompressed read data, and transfers the encrypted, uncompressed read data to the host.

Other aspects and advantages may be realized, depending upon the particular application.

DETAILED DESCRIPTION

Figure 1:
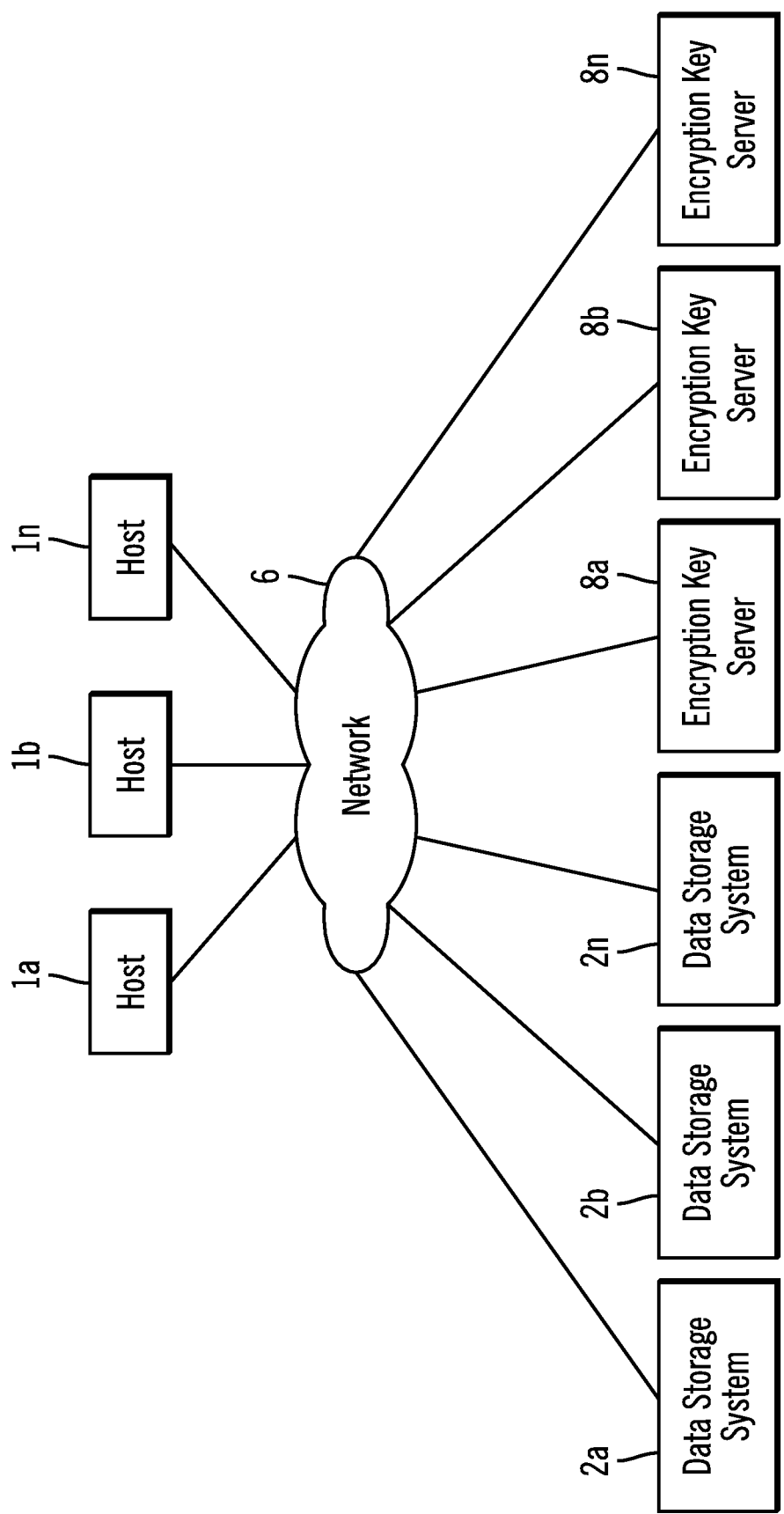
FIG. 1 illustrates an embodiment of a computing environment employing dynamic compression with dynamic multi-stage encryption for a data storage system in accordance with one aspect of the present description.

Dynamic compression with dynamic multi-stage encryption for a data storage system in accordance with one aspect of the present description provides a significant improvement in computer technology. For example, dynamic compression with dynamic multi-stage encryption in accordance with one aspect of the present description can significantly increase opportunities for data compression to improve data storage efficiency notwithstanding that encrypted data provided by a host for storage was not compressed prior to being encrypted by the host.

As noted above, to avoid excessive depletion of a MIPS resource by data compression, the host may opt to bypass data compression prior to encrypting the data to maintain a sufficient level of input/output operations directed to the storage controller. As a result, in known data storage systems, encrypted data is frequently stored as uncompressed, encrypted data, consuming substantial storage resources as compared to data which has been both compressed and encrypted by the host prior to transmitting the compressed, encrypted data to the storage controller for storage.

Thus, a host may experience workloads in which the host does not have sufficient MIPs to compress the data prior to encrypting the data for transmission to the storage controller for storage as encrypted data, without adversely affecting input/output performance. However, it is appreciated herein that if the host lacks sufficient MIPs to compress the data prior to encrypting the data for transmission to the storage controller, the storage controller itself may well have sufficient available MIPs for data compression. As explained in greater detail below, in one embodiment, dynamic compression with dynamic multi-stage encryption in accordance with the present description preserves end-to-end encryption while compressing data which was received from the host in encrypted but uncompressed form, using MIPs and other processing resources of the storage controller instead of the host. As a result, data compression may be more frequently employed in end-to-end encryption notwithstanding that the host itself may lack sufficient MIPs for data compression.

In one embodiment of dynamic compression with dynamic multi-stage encryption in accordance with the present description, the storage controller decrypts encrypted but uncompressed data received from the host to unencrypted data and compresses the unencrypted data to compressed data. The storage controller then encrypts the compressed data to encrypted, compressed data and stores the encrypted, compressed data in a storage device controlled by the storage controller. In this manner, the storage controller preserves end-to-end encryption while compressing data which was received from the host in encrypted form, using MIPs and other processing resources of the storage controller instead of those of the host. As a result, data compression may be more frequently employed in end-to-end encryption notwithstanding that the host itself may lack sufficient MIPs for data compression without adversely impacting input/output operations.

In another aspect of dynamic compression with dynamic multi-stage encryption in accordance with the present description, logic such as an intelligent agent determines whether to compress a data record within a host and storage system and if so, where such compression may be accomplished given the resources available within the system. For example, a cost may be calculated for each data record using several factors to determine whether to compress the data before transferring the data from the host to the storage system as compared to compressing the data after it is received by the storage system for storage. In one embodiment, the cost factors include whether the data is already encrypted or de-duplicated, load balancing based upon the respective MIPs and processor resources available to the host and storage system, the bandwidth available on the transfer link between the host and storage system, and the cryptographic hardware resources available. Depending upon the relative cost calculated, the system either compresses the data before or after transferring it between the host and storage system or bypasses compression altogether. In one embodiment, the host may issue hints in the form of compression status flags to indicate whether compression or decompression should occur at the storage controller. In this manner, system performance may be significantly improved in connection with compressing, encrypting, and de-duplicating data within the system.

To increase the security of the end-to-end encryption, in one embodiment, any unencrypted data byproducts such as residual data of the storage controller decryption, compression and re-encryption processes are securely erased by the storage controller. For example, the decryption of the encrypted data from the host to unencrypted data may be performed in a designated volatile memory area of the storage controller, which is securely erased in a secure data overwrite process to ensure erasure of unencrypted data resultant from the decrypting, compression or re-encryption processes. Other aspects and advantages may be realized, depending upon the particular application.

A system of one or more computers may be configured for dynamic compression with dynamic multi-stage encryption in accordance with the present description, by virtue of having software, firmware, hardware, or a combination of them installed on the system that in operation causes or cause the system to perform write transfer resource management in accordance with the present description. For example, one or more computer programs may be configured to perform dynamic compression with dynamic multi-stage encryption for a data storage system by virtue of including instructions that, when executed by data processing apparatus such as for example a storage controller processor, cause the apparatus to perform the actions. As used herein, the term "compression" refers to any suitable algorithmic compression process which manipulates data by re-encoding a string of data so that the size of the resultant string of data is reduced in size compared to the original string of data prior to the algorithmic manipulation.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

FIGS. 1-4 illustrate an embodiment of a computing environment employing dynamic compression with dynamic multi-stage encryption for a data storage system in accordance with the present description. In this example, a plurality of hosts 1a, 1b . . . 1n may submit Input/Output (I/O) requests to one or more data storage devices or systems 2a, 2b, 2n over a network 6 to access data stored by the data storage systems. Each host 1a, 1b . . . 1n and data storage system 2a, 2b, . . . 2n may obtain an encryption key over a network 6 from a key server 8a, 8b . . . 8n, for purposes of data encryption and decryption by the system. The hosts 1a, 1b . . . 1n may be separate physical devices or may be virtual devices implemented using assigned resources of partitions of a server, for example. In a similar manner, the data storage systems 2a, 2b . . . 2n and the key servers 8a, 8b . . . 8n may be separate physical devices or may be virtual devices implemented using assigned resources of partitions one or more servers, for example.

A key server which provides an original encryption key in response to a request from a data storage system, is often referred to as the master key server. A copy of the encryption key is typically mirrored to other key servers to store copies of the encryption key for safe keeping. The key servers storing the copies of the encryption key are typically referred to as clone or peer key servers.

Figure 2:
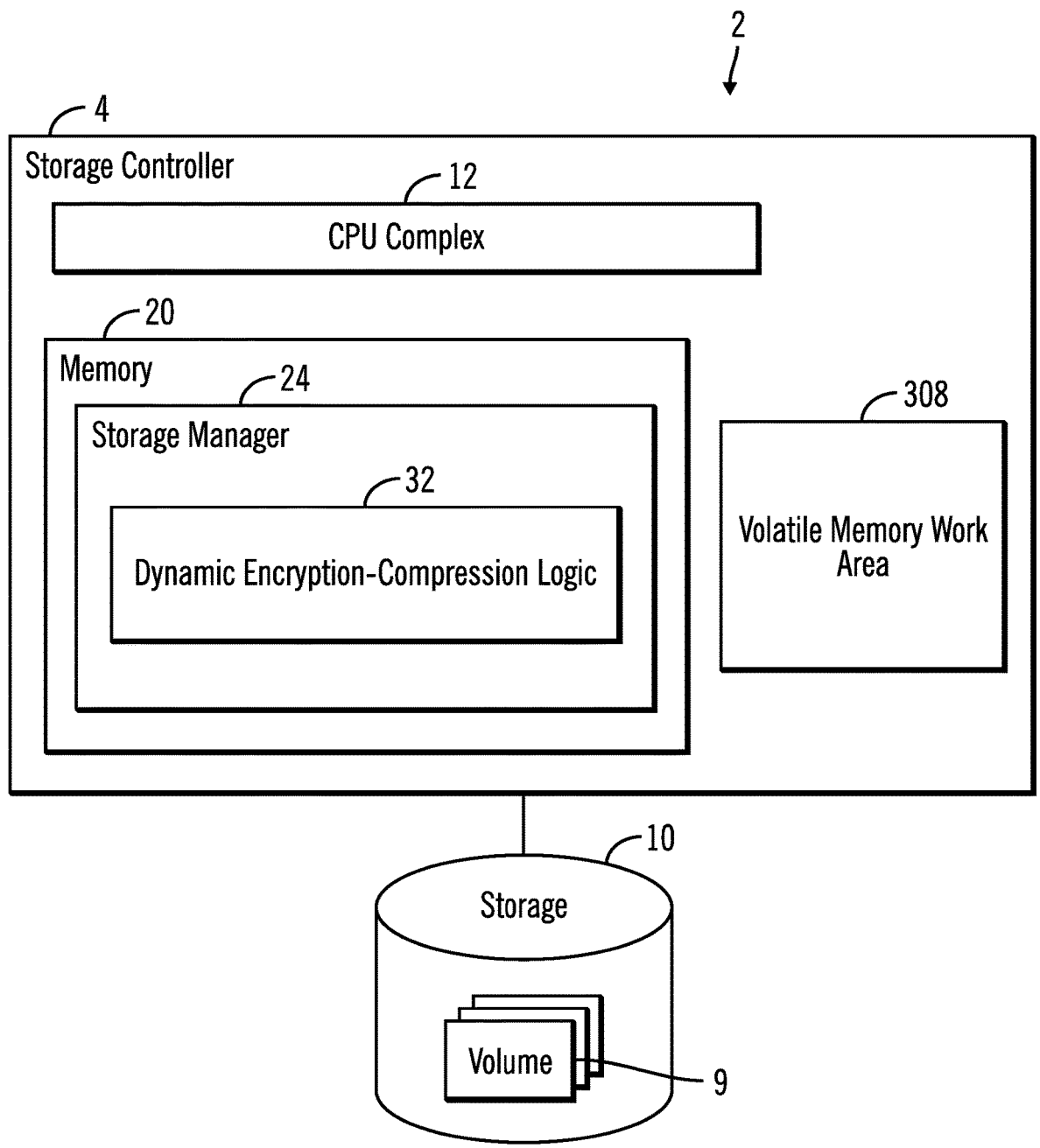
FIG. 2 illustrates an example of a data storage system including a storage controller of the computing environment of FIG. 1, employing dynamic compression with dynamic multi-stage encryption for a data storage system in accordance with one aspect of the present description.
Figure 3:
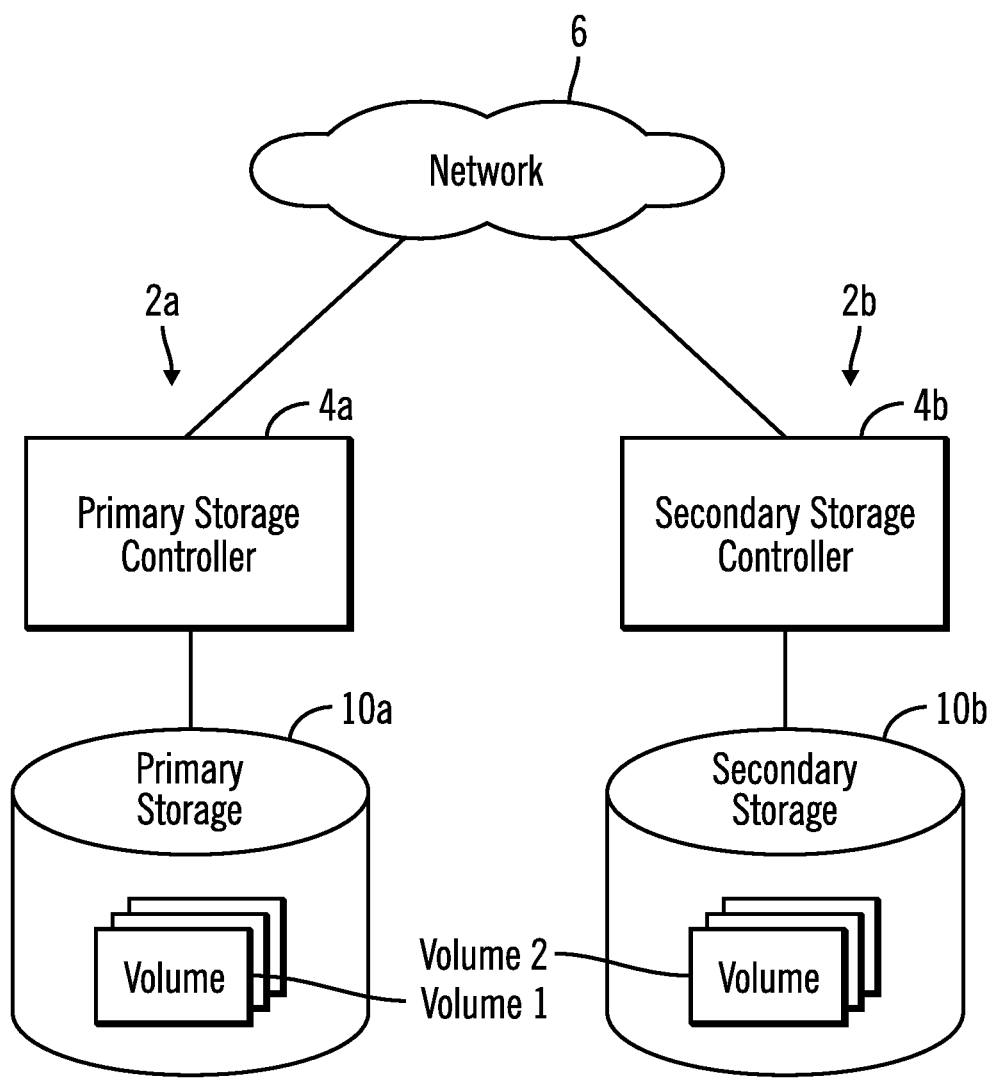
FIG. 3 illustrates an example of a primary and secondary data storage system including storage controllers of the computing environment of FIG. 1, employing dynamic compression with dynamic multi-stage encryption for a data storage system in accordance with one aspect of the present description.

FIG. 2 shows in greater detail an example of a data storage system 2 employing dynamic compression with dynamic multi-stage encryption in accordance with the present description. The data storage system 2 is similar to and representative of the data storage systems 2a, 2b . . . 2n (FIG. 1). FIG. 3 illustrates an example of a storage system having a primary data storage system 2a and a secondary data storage system 2b, in which one or both of the primary or secondary storage systems employ dynamic compression with dynamic multi-stage encryption in accordance with one aspect of the present description.

Each data storage system 2 (FIG. 2), 2a, 2b . . . 2n (FIG. 1) includes a storage controller or control unit 4 (FIG. 2), 4a (FIG. 3), 4b which accesses data at volumes 9 (FIG. 2), volume1, volume2 (FIG. 3) (e.g., LUNs (Logical Units), Logical Devices, Logical Subsystems, etc.) in storage represented by one or more storage drives 10 (FIG. 2), 10a, (FIG. 3), 10b (FIG. 3). Each storage controller 4, 4a, 4b includes a CPU complex 12 (FIG. 2), including processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 (FIG. 2), 4a (FIG. 3), 4b further has a memory 20 (FIG. 2) that includes a storage manager 24 for managing storage operations including writing data to or reading data from an associated storage 10, 10a (FIG. 3), 10b, respectively, in response to an I/O data request from a host. The storage operations managed by the storage manager 24 further include data replication operations from a primary volume1 (FIG. 3) of a primary data storage system such as the data storage system 2a, for example, to a secondary volume2 at a secondary data storage system such as the data storage system 2b, for example. The storage manager 24 is configured to generate copies of the primary volume1 (FIG. 3) of the primary data storage system 2a as a secondary volume2 (FIG. 3) of the secondary data storage system 2b. The pair of volumes, volume1, volume2 are in a copy relationship such that updates to the primary volume1 are replicated to the secondary volume2.

The CPU complex 12 of each storage controller may have multiple clusters of processors, each cluster having its own assigned memory 20, storage manager 24, cache, etc. The processing and memory resources assigned each cluster may be physical, virtual, shared, transferrable or dedicated, depending upon the particular application.

As described in greater detail below, dynamic encryption-compression logic 32 of the storage manager 24 preserves end-to-end encryption while providing the capability of compressing data which was received from the host in encrypted but not compressed form, using MIPs and other processing resources of the storage controller instead of the host. As a result, data compression may be more frequently employed in end-to-end encryption notwithstanding that the host itself may lack sufficient MIPs or other resources for data compression.

In the illustrated embodiment, the storage manager 24 including the dynamic encryption-compression logic 32 of the storage manager 24, is depicted as software stored in the memory 20 and executed by the CPU complex 12. However, it is appreciated that the logic functions of the storage manager 24 may be implemented as hardware, software, firmware or any combination of one or more thereof, depending upon the particular application.

In one embodiment, the storage or storage drives 10, 10a, 10b may be comprised of one or more sequential access storage devices, such as hard disk drives and magnetic tape or may include non-sequential access storage devices such as solid state drives (SSD), for example. Each storage drive 10, 10a, 10b may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

The storage units of the storage drives 10, 10a, 10b may be configured to store data in subunits or domains of data storage such as volumes, tracks, extents, blocks, pages, segments, cylinders, etc. Although dynamic compression with dynamic multi-stage encryption in accordance with the present description is described in connection with storage subunits such as volumes, it is appreciated that dynamic compression with dynamic multi-stage encryption in accordance with the present description is applicable to other storage subunits such as tracks, extents, blocks, pages, segments, cylinders, etc.

The system components 1a, 1b . . . 1n, 4, 4a, 4b, 10, 10a, 10b are connected to the network 6 which enables communication among these components. Thus, the network 6 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage systems to the hosts 1a, 1b, . . . 1n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 4:
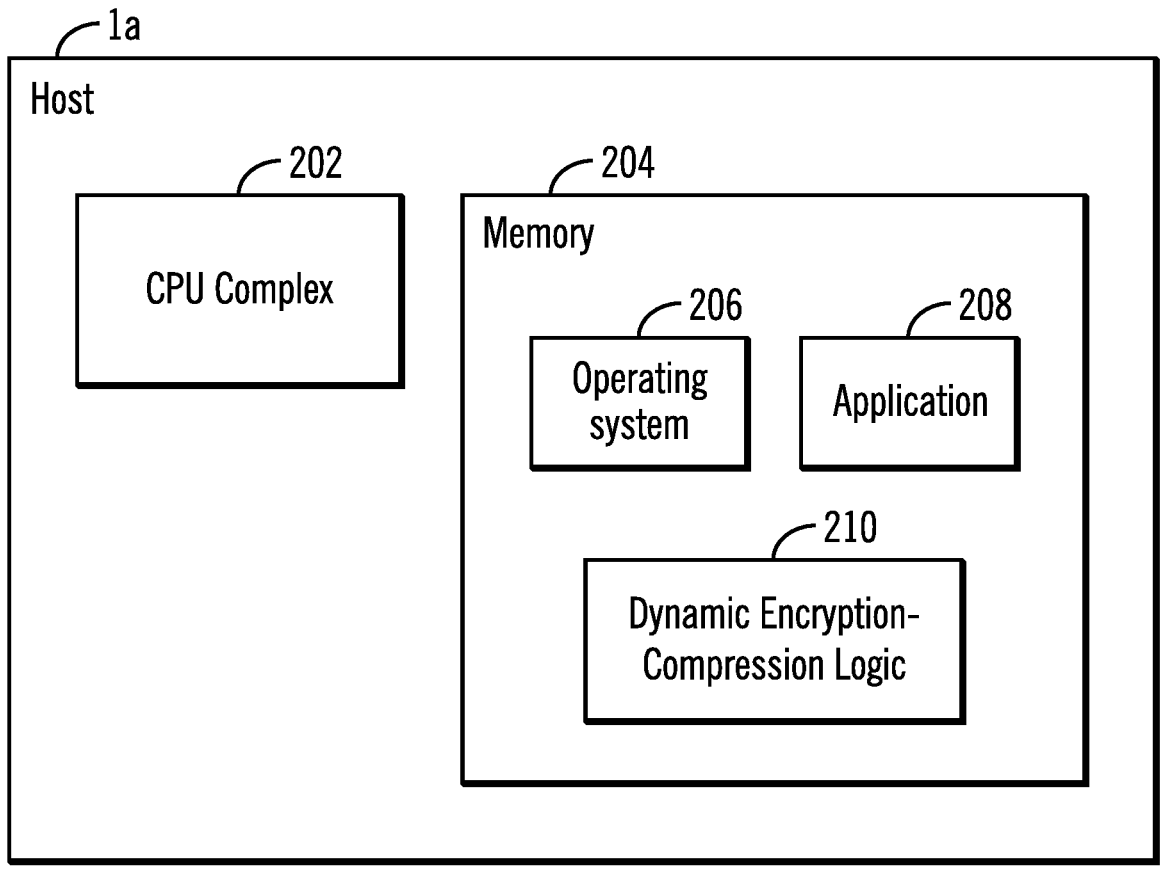
FIG. 4 illustrates an example of a host of the computing environment of FIG. 1, employing dynamic compression with dynamic multi-stage encryption for a data storage system in accordance with one aspect of the present description.

A typical host as represented by the host 1a of FIG. 4 includes a CPU complex 202 and a memory 204 having an operating system 206 and an application 208 that cooperate to read data from and write data updates to the primary storage 10a (FIG. 3) or secondary storage 10b via a storage controller 4, 4a, 4b. An example of a suitable operating system is the z/OS operating system. It is appreciated that other types of operating systems may be employed, depending upon the particular application.

Dynamic compression with dynamic multi-stage encryption in accordance with the present description, may be applied to any computer system providing data storage, as represented by the dynamic encryption-compression logic 32 (FIG. 2). Each host such as the host 1a, for example, may also employ dynamic encryption-compression logic 210 for dynamically compressing and encrypting data for storage. In one embodiment, as explained in greater detail below, one or both of the dynamic encryption-compression logic 32 of the storage controller and the dynamic encryption-compression logic 210 of the host has logic configured to determine as a function of a comparison of available resources of the host and the appropriate storage controller, whether to selectively compress unencrypted data at the host prior to encrypting and transferring encrypted data to the storage controller, or whether to selectively bypass compressing unencrypted data at the host prior to encrypting and transferring encrypted, uncompressed data to the storage controller. If compression is bypassed at the host, encrypted data may be de-encrypted, compressed and encrypted again by the storage controller prior to storage as described in greater detail below. As a result, storage resources may be more efficiently utilized while preserving end-to-end encryption.

In the illustrated embodiment, the dynamic encryption-compression logic 210 of the host 1a, is depicted as software stored in the memory 204 and executed by the CPU complex 202. However, it is appreciated that the logic functions of the dynamic encryption-compression logic 210 may be implemented as hardware, software, firmware or any combination of one or more thereof, depending upon the particular application.

The hosts 1a, 1b . . . 1n, the storage controllers 4, 4a, 4b controlling storage devices 10, 10a, 10b of the storage systems 2a, 2b . . . 2n, and the dynamic encryption-compression logic 32, 210 may each be implemented using any computational device which has been modified for dynamic compression with dynamic multi-stage encryption in accordance with the present description. Computational devices suitable for modification as described herein include those presently known in the art, such as, a personal computer, a workstation, a server, a mainframe, a hand held computer, a palm top computer, a telephony device, a network appliance, a blade computer, a processing device, etc. The hosts 1a, 1b . . . 1n, the storage controllers 4, 4a, 4b controlling storage devices 10, 10a, 10b of the storage systems 2a, 2b . . . 2n, and the dynamic encryption-compression logic 32, 210, may be elements in any suitable network, such as, a storage area network, a wide area network, the Internet, an intranet, or elements in a cloud computing environment.

Figure 5:
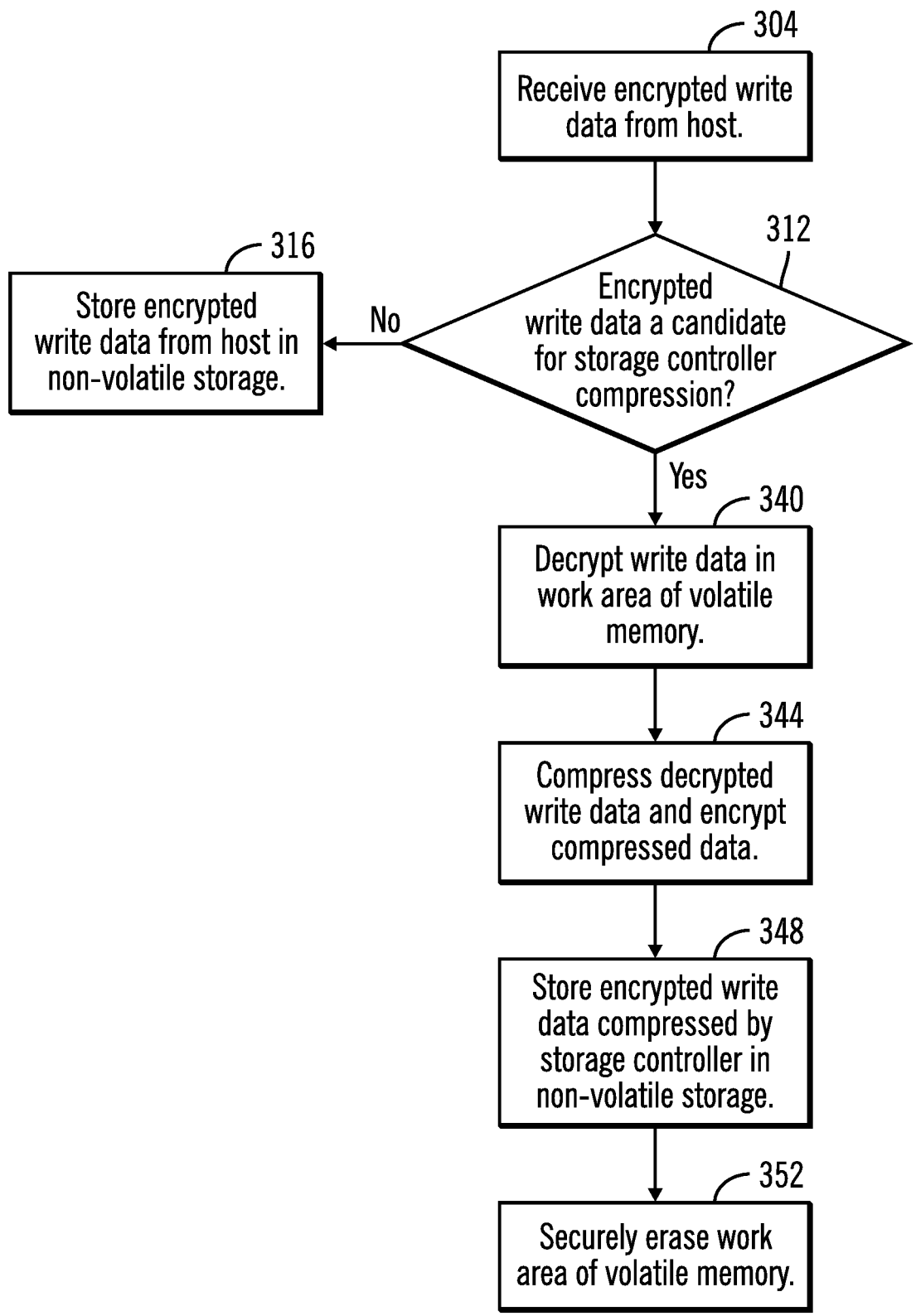
FIG. 5 illustrates an example of operations of components of the computing environment of FIG. 1, employing dynamic compression with dynamic multi-stage encryption for a data storage system in accordance with one aspect of the present description.

FIG. 5 depicts one embodiment of operations of the storage manager 24 (FIG. 2) of the storage controller 4 including the dynamic encryption-compression logic 32. In this example, logic elements of the storage manager 24 of the storage controller 4 are configured to perform end-to-end encrypted write operations as depicted in FIG. 5 and the accompanying description herein. Accordingly, the storage manager 24 is configured to receive (block 304, FIG. 5) write data from a host such as a host 1a. As part of an end-to-end encrypted write process, the write data has been encrypted by the host in this example so that the write data is protected by encryption when transferred over the network 6 (FIG. 1) from the host 1a to the storage controller 4 (FIG. 2) for storage in a storage 10 (FIG. 2). To encrypt the write data, the host may obtain a suitable encryption key by retrieving an encryption key from one of the encryption key servers 8a, 8b . . . 8n (FIG. 1). In one embodiment, the encrypted data may be stored by the storage controller 4 (FIG. 2) directly in a storage 10, either permanently or on a temporary basis in which encrypted but uncompressed data may be subsequently replaced by encrypted, compressed data as described herein.

In one aspect of dynamic compression with dynamic multi-stage encryption in accordance with the present description, the dynamic encryption-compression logic 32 (FIG. 2) of the storage controller 4 is configured to store the encrypted write data from the host in a designated volatile memory work area 308 (FIG. 2) of the memory 20 of the storage controller 4. As explained in greater detail below, computational data for decryption, compression and encryption operations by the storage controller 4 are, in one embodiment, restricted to the designated volatile memory work area 308 to facilitate secure erasure of any unencrypted data upon completion of these operations to ensure data integrity of the write data received from the host.

A determination (block 312, FIG. 5) is made as to whether the received encrypted write data is a suitable candidate for compression by the storage controller. For example, if the encrypted write data received from the host has already been compressed or has already been de-duplicated by the host or is not substantially compressible, the encrypted write data may not be a good candidate for compression by the storage controller. However, it is appreciated that in some applications, encrypted write data which has already been compressed or de-duplicated by the host may nonetheless also be a candidate for compression by the storage controller. As explained in greater detail below, it may be determined that write data is a candidate for compression by the storage controller using a hint supplied by the host. Similarly, it may be determined that read data is a candidate for de-compression by the storage controller using a compression status tag stored by the storage controller. In one embodiment, the storage controller stores a compression status tag for a volume or other data domain which indicates whether the data of the tagged domain has been compressed, for example.

If it is determined (block 312) that the received encrypted write data is not a suitable candidate for compression by the storage controller, the encrypted write data received from the host is stored (block 316, FIG. 5) by the storage controller 4 in storage 10, bypassing data compression by the storage controller. In one embodiment, the encrypted write data is stored unchanged from the form in which it was received from the host. However, it is appreciated that the storage controller 4 may in some embodiments nonetheless modify the encrypted write from the host even if compression by the storage controller is bypassed. Such data modification techniques may include data deduplication for example. Other data storage and modification techniques may be utilized depending upon the particular application.

Figure 6:
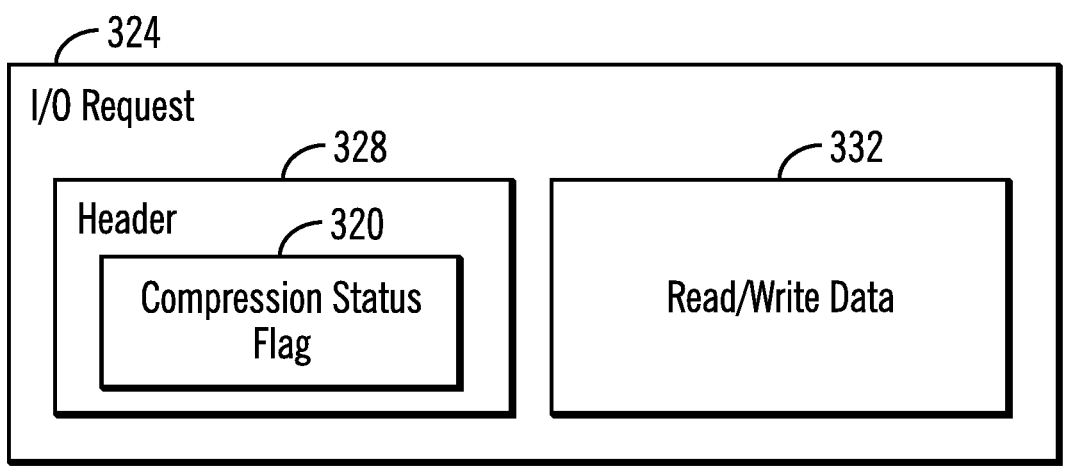
FIG. 6 illustrates an example of a compression status flag employed with dynamic compression with dynamic multi-stage encryption for a data storage system in accordance with one aspect of the present description.

It is appreciated that the storage controller 4 may utilize a variety of techniques to determine whether the received encrypted write data is a suitable candidate for compression by the storage controller. In one aspect of dynamic compression with dynamic multi-stage encryption in accordance with the present description, the dynamic encryption-compression logic 32 of the storage controller 4 receives from the host, a "hint" in the form of a compression status flag 320 (FIG. 6) which is associated with the encrypted data from the host. The dynamic encryption-compression logic 32 is configured to determine as a function of a state of the compression status flag 320 whether the received encrypted write data is a suitable candidate for compression by the storage controller. FIG. 6 depicts a representation of one example of an I/O request 324 from a host such as a write operation directed by the host to a storage controller. In this example, the I/O request 324 includes a header 328 and a payload 332 in which the header 328 includes an I/O request command such as a write or read command, and a compression status flag 320 which may include a compression hint from the host which indicates whether the tagged data has already been compressed or is compressible, for example. The payload 332 for a write I/O request includes the write data which may be encrypted. In this manner, a compression status flag may be associated with a particular I/O operation. In other embodiments, a compression status flag may apply to all write data or may be associated with a particular volume or other subunit of storage in the storage 10 such as a write domain. For example, the storage controller may store the compression hint from the host in association with a volume, write domain or other data subunit to which it applies to indicate whether the associated data is a good candidate for compression by the storage controller.

In one embodiment, the compression status flag 320 has multiple states which indicate whether or not encrypted data of the payload 332 received from the host and associated with the compression status flag 320, is a good candidate for compression by the storage controller. For example, as noted above, if the encrypted write data received from the host has already been compressed or has already been de-duplicated by the host or is not substantially compressible, the encrypted write data may not be a good candidate for compression by the storage controller. However, it is appreciated that in some applications encrypted write data which has already been compressed or de-duplicated by the host may nonetheless also be a candidate for compression by the storage controller depending upon the particular application.

In one embodiment, the compression status flag 320 may have two states represented by the value of a single flag bit which when set indicates that the encrypted data of the payload 332 received from the host and associated with the compression status flag 320, is a good candidate for compression by the storage controller. Conversely, a single flag bit when reset may indicate that the encrypted data of the payload 332 received from the host and associated with the compression status flag 320, is not a good candidate for compression by the storage controller. It is appreciated that in other embodiments, a compression status flag 320 may have multiple bits capable of representing more than two states and identifying various states of the encrypted data of the payload 332 received from the host including whether the data has already been compressed, already de-duplicated, is not compressible and other states, depending upon the particular application.

As noted above, if it is determined (block 312) that the received encrypted write data is not a suitable candidate for compression by the storage controller, the encrypted write data received from the host is stored (block 316, FIG. 5) by the storage controller 4 in storage 10, bypassing data compression by the storage controller. In one embodiment, the storage controller sets a compression status flag bit of a compression status tag which is stored (block 316, FIG. 5) in association with the stored data to indicate that the stored data has not been compressed by the storage controller. The compression status tag may be used with read operations as described below.

If the dynamic encryption-compression logic 32 (FIG. 2) of the storage controller 4 determines as a function of a state of the compression status flag 320 (FIG. 6) associated with the encrypted data received (block 304) from the host, that the received encrypted write data is a suitable candidate for compression by the storage controller, the dynamic encryption-compression logic 32 (FIG. 2) decrypts (block 340, FIG. 5) the encrypted write data to unencrypted form using the volatile memory work area 308 to temporarily store any intermediate work product data of the decryption process. For example, the state of the compression status flag 320 (FIG. 6) may indicate that the associated encrypted data received (block 304) from the host is both uncompressed and is compressible.

To decrypt the encrypted data received (block 304) from the host, the dynamic encryption-compression logic 32 (FIG. 2) of the storage controller 4 may obtain a suitable encryption/decryption key by retrieving an encryption/decryption key from one of the key servers 8a, 8b . . . 8n (FIG. 1). In one embodiment, the encryption/decryption key obtained by the storage controller to decrypt the encrypted data may be the same encryption/decryption key used by the host to encrypt the write data prior to forwarding the write data to the storage controller.

In the illustrated embodiment, the dynamic encryption-compression logic 32 (FIG. 2) decrypts (block 340, FIG. 5) the encrypted write data to unencrypted form in a volatile media aware computational process which ensures that all data in the decryption computational paths is confined to the defined area 308 (FIG. 2) of the volatile media of the memory 20. One example of a suitable defined area 308 is a portion of cache or other memory implemented in volatile random access memory (RAM). Thus, in one embodiment, the defined area 308 would preferably not be implemented in nonvolatile memory or storage. However, it is appreciated that in some embodiments, nonvolatile storage may be utilized. Confining computational processes to the defined area 308 can facilitate secure erasure of any unencrypted data from the computational processes to ensure integrity of the end-to-end encryption write process as described below.

Once decrypted, the decrypted write data may be compressed (block 344, FIG. 5) using any suitable compression algorithm. Here too, a volatile media aware computational process may be utilized which ensures that all data in the compression computational paths is confined to the defined area 308 (FIG. 2) of the volatile media of the memory 20. By compressing the decrypted write data, the amount of storage required to store the write data of the end-to end encrypted write process may be significantly reduced.

Once the decrypted write data has been compressed, the compressed and decrypted write data may be encrypted (block 344, FIG. 5) again (that is, re-encrypted). In one embodiment, the dynamic encryption-compression logic 32 (FIG. 2) of the storage controller 4 may obtain from one of the key servers 8a, 8b . . . 8n (FIG. 1), the same encryption/decryption key which was utilized by the host to initially encrypt the write data prior to transferring it to the storage controller 4. In other embodiments, the dynamic encryption-compression logic 32 (FIG. 2) of the storage controller 4 may obtain from one of the key servers 8a, 8b . . . 8n (FIG. 1), an encryption/decryption key which is different from the one utilized by the host. The encryption key obtained by the storage controller is used to encrypt (block 344, FIG. 5) the compressed and decrypted write prior to transferring the write data as compressed and encrypted write data for storage (block 348, FIG. 5) in the storage 10 (FIG. 2).

In one embodiment, the dynamic encryption-compression logic 32 (FIG. 2) of the storage controller 4 sets a compression status flag bit of a compression status tag associated with the write data to indicate that the associated encrypted write data has been compressed by the storage controller. In one embodiment, the compression status tag may be implemented as a data structure having a format similar to the compression status flag 320 of FIG. 6. The compression status tag set by the storage controller is stored (block 348, FIG. 5) with the associated write data for use with read operations as described below. Conversely, if compression by the storage controller is bypassed, the dynamic encryption-compression logic 32 (FIG. 2) of the storage controller 4 sets a bit of the compression status tag associated with the encrypted write data to indicate that the associated write data has not been compressed by the storage controller. Here too, the compression status tag set by the storage controller is stored (block 316, FIG. 5) with the associated write data for use with read operations as described below.

In this manner, a compression status tag may be associated with a particular I/O operation. In other embodiments, a compression status tag may apply to all write data or may be associated with a particular volume or other subunit of storage in the storage 10 such as a read domain. For example, the storage controller may store the compression status tag in association with a volume, read domain or other data subunit to which it applies to indicate whether the associated data has been compressed or is otherwise a good candidate for de-compression by the storage controller.

The encrypted and compressed write data and the associated compression status flag 320 may be stored directly from the designated volatile memory work area 308 (FIG. 2) of the memory 20 of the storage controller 4, to storage 10 or may be first cached in a suitable cache and subsequently destaged to storage 10 at the appropriate time. However, any unencrypted data from the decryption, compression and re-encryption processes that may have remained in the designated volatile memory work area 308 is securely erased (block 352, FIG. 5).

In one embodiment, secure erasure of unencrypted data is performed by overwriting data in the designated volatile memory work area 308 using strings of data to completely destroy the data in the area 308. Examples of suitable strings include strings of zeros, strings of ones, strings of random and pseudo-random patterns of zeros and ones, etc. The number of times data to be destroyed is overwritten may be selected in some embodiments, depending upon the level of security desired. In general, the more times data is overwritten, the greater the security that the data has been effectively destroyed. It is appreciated that other secure data erasure techniques may be employed, depending upon the particular application. In some embodiments, the successful destruction of the data in the area 308 may be verified using various verification techniques.

In one embodiment, the secure erasure of data in the work area 308 may be triggered by the completion of the decryption, compression and re-encryption processes and storage of the compressed and encrypted write data in the storage 10. However, it is appreciated that erasure of data in the work area 308 may be triggered by events which may occur prior to completion of these processes and the storage of the compressed and encrypted write data in the storage 10 by the storage controller 4. For example, a power off event, failover, fallback, warm start, quiesce or resume operation may be occur due to a software or hardware failure which prevents completion of the decryption, compression and re-encryption processes and storage of the compressed and encrypted write data in the storage 10 by the storage controller 4. Accordingly, these hardware or software failure related events may trigger secure erasure of data in the work area 308 to ensure that any unencrypted data does not remain in the work area 308.

Figure 7:
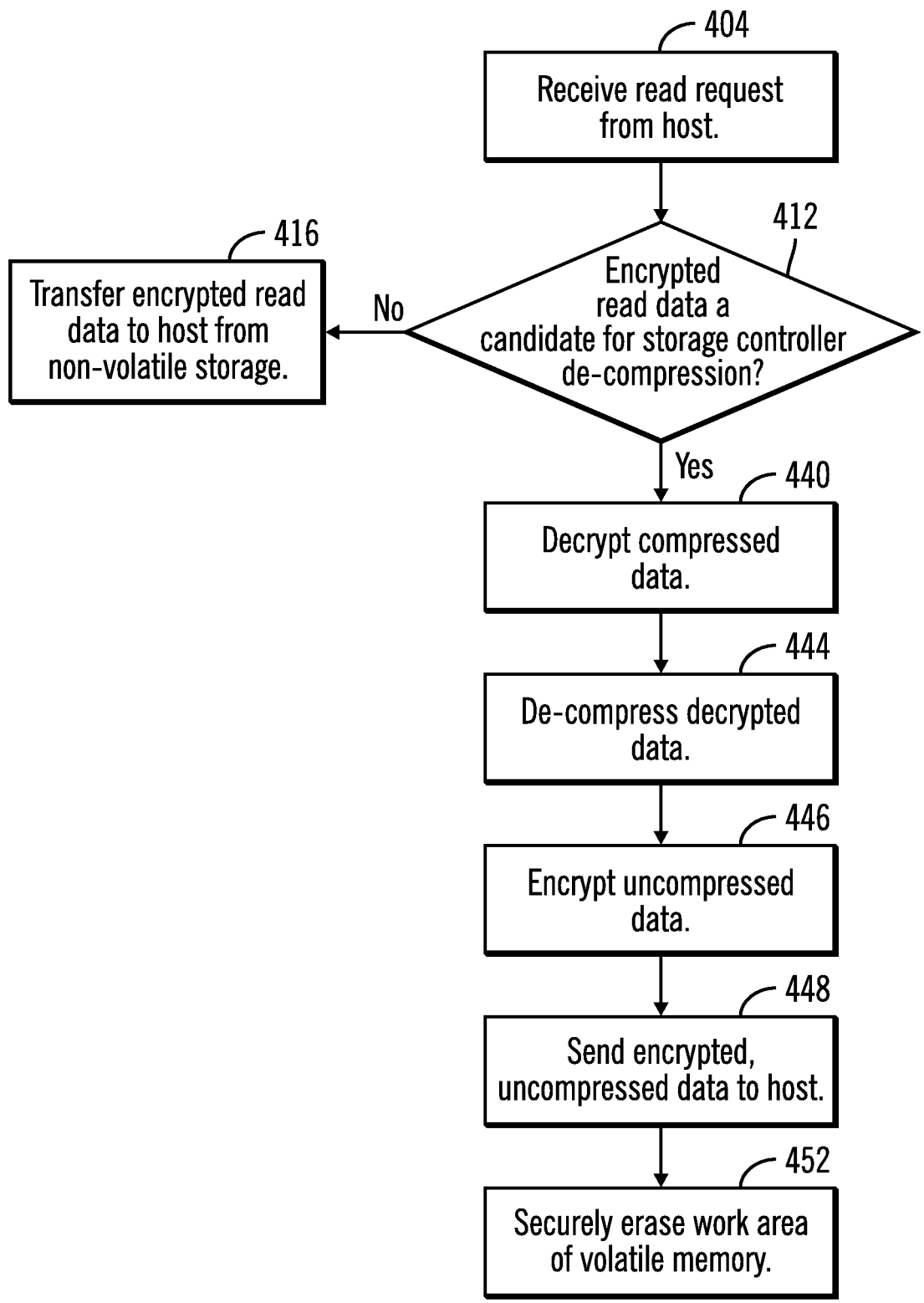
FIG. 7 illustrates another example of operations of components of the computing environment of FIG. 1, employing dynamic compression with dynamic multi-stage encryption for a data storage system in accordance with one aspect of the present description.

FIG. 7 depicts another embodiment of operations of the storage manager 24 (FIG. 2) including the dynamic encryption-compression logic 32. In this example, logic elements of the storage manager 24 of the storage controller 4 are configured to perform end-to-end encrypted read operations as depicted in FIG. 7 and the accompanying description herein. Accordingly, the storage manager 24 is configured to receive (block 404, FIG. 7) a read request from a host such as a host 1a, to read encrypted write data stored in the storage 10 in an end-to-end encrypted read process. As described above in connection with FIG. 5, in one example, the encrypted write data stored in a storage 10 may have been last encrypted by the storage controller 4, and in another example, the encrypted write data stored in a storage may have been last encrypted by the host itself. In one embodiment, if last encrypted by the storage controller, the encrypted write data to be read was previously decrypted and compressed by the storage controller prior to being re-encrypted and stored by the storage controller 4 as described above in connection with FIG. 5.

Accordingly, in response to a received read request, a determination (block 412, FIG. 7) is made as to whether the requested encrypted read data is a suitable candidate for de-compression by the storage controller. For example, if the encrypted read data to be transferred to the host was stored (block 316, FIG. 5) without being first compressed (block 344, FIG. 5) by the storage controller as described in connection with FIG. 5, the requested encrypted read data may not be a good candidate for de-compression by the storage controller. However, it is appreciated that in some applications encrypted read data which has not been compressed by the storage controller may nonetheless be a candidate for de-compression by the storage controller. For example, if the requested read data has been compressed by the host prior to storage by the storage controller, in some embodiments, the compressed data may nonetheless be de-compressed by the storage controller prior to forwarding the decompressed data to the host. As explained in greater detail below, it may be determined that data is a candidate for de-compression by the storage controller using a hint from a host or checking if a compression status tag for a storage controller volume or other data domain indicates whether the tagged data has been compressed by the storage controller or is otherwise de-compressible, for example.

If it is determined (block 412) that the requested encrypted read data is not a suitable candidate for de-compression by the storage controller, the encrypted read data received from the storage 10 is transferred (block 416, FIG. 7) by the storage controller 4 directly to the requesting host over the network 6, bypassing data decryption, de-compression and re-encryption by the storage controller. In one embodiment, the encrypted read data is transferred unchanged from the form in which it was read from the storage 10. However, it is appreciated that the storage controller 4 may in some embodiments nonetheless modify the encrypted read data from the storage 10 even if de-compression by the storage controller is bypassed. Such data modification techniques may include formatting read data in packets for transfer over the network 6 for example. Other data transmission and modification techniques may be utilized depending upon the particular application.

It is further appreciated that the storage controller 4 may utilize a variety of techniques to determine whether the requested encrypted read data is a suitable candidate for de-compression by the storage controller. As noted above in connection with FIG. 5, in one embodiment, the dynamic encryption-compression logic 32 (FIG. 2) of the storage controller 4 sets a bit of a compression status tag associated with the encrypted write data to be stored, to indicate whether or not the associated write data being stored has been compressed by the storage controller. For example, a compression status tag for a storage controller volume or other data domain may indicate whether the tagged data of the domain has been compressed by the storage controller or is otherwise a suitable candidate for de-compression by the storage controller. The compression status tag set by the storage controller is stored (block 316, 348, FIG. 7) with the associated write data for use with read operations as described below. In addition, a compression hint from the host in the form of a compression status flag 320, for example, and associated with the requested read data may indicate whether the requested read data is a suitable candidate for de-compression by the storage controller. A compression hint from the host or a compression status tag set by the storage controller may be associated with a particular I/O operation or may apply to all read data or may be associated with a particular volume or other subunit of storage in the storage 10 such as a read domain.

Accordingly, in response to receipt (block 404, FIG. 7) of a request to read encrypted data stored on a storage 10, the dynamic encryption-compression logic 32 (FIG. 2) of the storage controller 4 may examine (block 412, FIG. 7) a compression status tag set by the storage controller and stored in association with the requested encrypted read data to determine whether or not the associated read data to be read has been compressed by the storage controller. In this manner, it may be determined whether or not the requested encrypted read data is a suitable candidate for de-compression by the storage controller. As noted above, if it is determined (block 412) that the requested read data is not a suitable candidate for de-compression by the storage controller, the encrypted read data received from the storage 10 is transferred (block 416, FIG. 7) by the storage controller 4 directly to the requesting host over the network 6, bypassing data decryption, de-compression and re-encryption by the storage controller.

In another aspect, it is appreciated that in some embodiments, the host can provide a hint in the form of a suitable compression status flag 320 to the storage controller 4, to send read data which has been compressed and encrypted by the storage controller, to the host for decryption and de-compression by the host, when the host has sufficient MIPs and other processor resources to perform the decompression of the storage controller compressed data at the host instead of at the storage controller. Such a hint may be provided by the host for all read data or may be associated with certain volumes or read domains to be read from the storage 10. In this manner, it may be determined (block 412) as a function of the compression hint from the host that the requested compressed and encrypted write data is not a suitable candidate for de-compression by the storage controller, and as a result, the encrypted and compressed read data received from the storage 10 is transferred (block 416, FIG. 7) by the storage controller 4 directly to the requesting host over the network 6, bypassing data decryption, de-compression and re-encryption by the storage controller. In cases where data has been encrypted by the storage controller but decrypted by the host, such encryption and decryption may be facilitated by the host and storage controller using the same encryption/decryption key.

If it is determined (block 412, FIG. 7) by examining a compression status flag 320 (FIG. 6) provided by the host or a compression status tag set by the storage controller and stored in association with the requested encrypted read data, that the requested encrypted read data is a suitable candidate for de-compression by the storage controller, the dynamic encryption-compression logic 32 (FIG. 2) decrypts (block 440, FIG. 7) the encrypted read data to unencrypted form using the volatile memory work area 308 (FIG. 2) to temporarily store any intermediate work product data of the decryption process. To decrypt the encrypted read data retrieved from a storage 10 in response to the read request, the dynamic encryption-compression logic 32 (FIG. 2) of the storage controller 4 may obtain a suitable encryption/decryption key by retrieving an encryption/decryption key from one of the key servers 8a, 8b . . . 8n (FIG. 1). In one embodiment, the encryption/decryption key obtained by the storage controller to decrypt the encrypted read data may be the same encryption/decryption key used by the storage controller to encrypt (block 344, FIG. 5) the write data prior to storing encrypted and compressed write data on the storage 10. Similarly, the encryption/decryption key obtained by the storage controller to decrypt the encrypted read data may be the same encryption/decryption key used by host to encrypt the data prior to transferring the data for storage on the storage 10.

In the illustrated embodiment, the dynamic encryption-compression logic 32 (FIG. 2) decrypts (block 440, FIG. 7) the encrypted read data requested by the host to unencrypted form in a volatile media aware computational process which ensures that all data in the decryption computational paths is confined to the defined area 308 (FIG. 2) of the volatile media of the memory 20. As noted above, confining computational processes to the defined area 308 can facilitate secure erasure of any unencrypted data from the computational processes to ensure integrity of the end-to-end encryption read process as described below.

Once decrypted, the unencrypted read data may be de-compressed (block 444, FIG. 7) to uncompressed read data using any suitable de-compression algorithm which typically is a function of the compression algorithm used to initially compress the data. Here too, a volatile media aware computational process may be utilized which ensures that all data in the de-compression computational paths is confined to the defined area 308 (FIG. 2) of the volatile media of the memory 20.

Once the decrypted read data has been uncompressed, the uncompressed and decrypted read data may be encrypted (block 446, FIG. 7) again, that is, re-encrypted. In one embodiment, the dynamic encryption-compression logic 32 (FIG. 2) of the storage controller 4 may obtain from one of the key servers 8a, 8b . . . 8n (FIG. 1), the same encryption/decryption key which was utilized by the host to initially encrypt the write data prior to transferring it to the storage controller 4. In other embodiments, the dynamic encryption-compression logic 32 (FIG. 2) of the storage controller 4 may obtain from one of the key servers 8a, 8b . . . 8n (FIG. 1), an encryption/decryption key which is different from the one utilized by the host. The encryption key obtained by the storage controller is used to encrypt (block 446, FIG. 7) the uncompressed and decrypted read data prior to transferring (block 448, FIG. 7) the read data as uncompressed and encrypted read data to the requesting host. The host may obtain from one of the key servers 8a, 8b . . . 8n (FIG. 1), the same encryption/decryption key which was utilized by the storage controller to encrypt the read data, for purposes of decrypting received read data which was encrypted by the storage controller. Any unencrypted data from the decryption, de-compression and re-encryption processes of the storage controller that may have remained in the designated volatile memory work area 308 is securely erased (block 452, FIG. 7) using a suitable data erasure process such as a secure data overwrite process in a manner similar to that described above in connection with FIG. 5.

Similarly, it may be determined (block 412) as a function of a compression hint from the host that the requested compressed and encrypted read data is a suitable candidate for de-compression by the storage controller. If so, the encrypted and compressed read data received from the storage 10 is decrypted (block 440), uncompressed (block 444) and re-encrypted (block 446) by the storage controller as described above.

Figure 8:
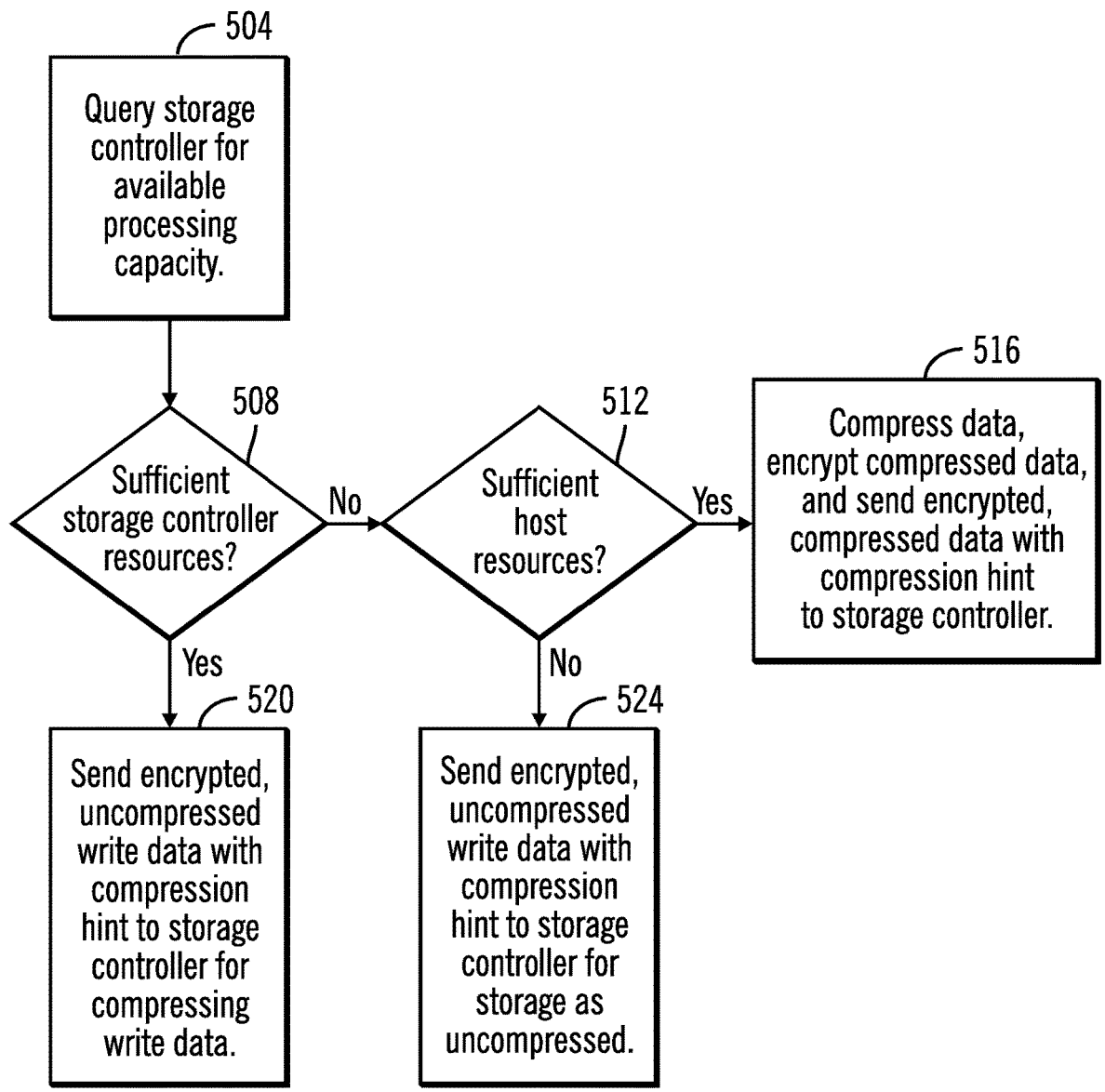
FIG. 8 illustrates another example of operations of components of the computing environment of FIG. 1, employing dynamic compression with dynamic multi-stage encryption for a data storage system in accordance with one aspect of the present description.

FIG. 8 depicts an example of operations of the dynamic encryption-compression logic 210 (FIG. 4) of a host 1a which, in another aspect of dynamic compression with dynamic multi-stage encryption in accordance with the present description, determines whether to compress a data record of write data within a host and storage system and if so, where such compression may be accomplished given the resources available within the system. For example, for write data to be encrypted and transferred to the storage controller, the dynamic encryption-compression logic 210 of the host 1a queries (block 504, FIG. 8) the dynamic encryption-compression logic 32 (FIG. 4) of the storage controller 4, to determine various cost factors such as whether (block 508, FIG. 8) the storage controller has sufficient available resources to undertake the data compression at the storage controller. Such a determination of storage controller resource availability may include a determination of available processing capacity, encryption/decryption capability, available transfer bandwidth to the storage controller and other capacity or resource measurements.

The determination of cost factors may further include a determination (block 512, FIG. 8) of available resources of the host which may include a determination of available host processing capacity, encryption/decryption capability, available transfer bandwidth to the storage controller and other capacity or resource measurements. Using these cost factors, load balancing between the host and the storage controller may be undertaken. For example, if it is determined (blocks 508, 512) that the storage controller has insufficient resources available as compared to those of host, the write data may be compressed (block 516, FIG. 8) before it is encrypted at the host and sent to the storage controller for storage in the storage 10. When sending compressed and encrypted data to the storage controller, the encrypted and compressed write data may be accompanied by a hint from the host in the form of a compression status flag 320 indicating that the associated write data is not a good candidate for compression by the storage controller as described above in connection with FIG. 5. When the data is stored by the storage controller, the storage controller may tag the stored data with a compression status tag indicating that the tagged data was not compressed by the storage controller.

Conversely, if it is determined (blocks 508, 512) that the storage controller has sufficient resources available as compared to those of host, the write data may be left uncompressed (block 520, FIG. 8) prior to being encrypted at the host and sent to the storage controller for decryption, compression, re-encryption and storage in the storage 10. When sending uncompressed but compressible and encrypted data to the storage controller, the encrypted and uncompressed write data may be accompanied by a hint from the host in the form of a compression status flag 320 indicating that the associated write data is a good candidate for compression by the storage controller as described above in connection with FIG. 5. When the data is stored by the storage controller, the storage controller may tag the stored data with a compression status tag indicating that the tagged data was compressed by the storage controller.

As yet another example, if it is determined (blocks 508, 512) that neither the storage controller nor the host has sufficient resources available, the write data may again be left uncompressed (block 520, FIG. 8) prior to being encrypted at the host and sent (block 524, FIG. 8) to the storage controller. When sending uncompressed and encrypted data to the storage controller, the encrypted and uncompressed write data may be accompanied by a hint from the host in the form of a compression status flag 320 indicating that the associated write data is not a good candidate for compression by the storage controller as described above in connection with FIG. 5, because the storage controller lacks sufficient resources for the compression. Accordingly, decryption, compression, and re-encryption at the storage controller may thus be bypassed prior to storage in the storage 10 as described above in connection with FIG. 5. When the data is stored by the storage controller, the storage controller may tag the stored data with a compression status tag indicating that the tagged data was not compressed by the storage controller.

It is appreciated that other examples are possible with dynamic compression with dynamic multi-stage encryption in accordance with the present description. For example, if it is determined that neither the storage controller nor the host has sufficient resources available, encryption and transfer of write data to the storage controller may be queued by the host or storage controller until sufficient resources are available for data compression at the host (block 516) or at the storage controller (block 520).

In a similar manner, dynamic encryption-compression logic 210 (FIG. 4) of a host 1a may in another aspect of dynamic compression with dynamic multi-stage encryption in accordance with the present description, determine where de-compression of compressed read data may be accomplished given the resources available within the system. For example, in connection with a read request to transfer encrypted read data from the storage controller to the host, the dynamic encryption-compression logic 210 of the host 1a queries the dynamic encryption-compression logic 32 (FIG. 4) of the storage controller 4, in a manner similar to that described above in connection with block 508, FIG. 8, to determine various cost factors such as whether the storage controller has sufficient available resources to undertake the data de-compression at the storage controller. Such a determination of storage controller resource availability may include a determination of available processing capacity, encryption/decryption capability, available transfer bandwidth from the storage controller to the host and other capacity and resource measurements as described above.

The determination of cost factors for read data de-compression may further include a determination of available resources of the host in a manner similar to that described above in connection with block 512, FIG. 8, which may include a determination of available host processing capacity, encryption/decryption capability, available transfer bandwidth from the storage controller to the host and other capacity and resource measurements. Using these cost factors, load balancing between the host and the storage controller may be undertaken for read data de-compression. For example, if it is determined that the storage controller has insufficient resources available as compared to those of host in a manner similar to that described above in connection with FIG. 8, a read request for encrypted data may be accompanied by a hint from the host in the form of a compression status flag 320 indicating that the associated read data is not a good candidate for de-compression by the storage controller as described above in connection with FIG. 7.

Conversely, if it is determined that the storage controller has sufficient resources available as compared to those of host in a manner similar to that described above in connection with FIG. 8, a read request for encrypted data may be accompanied by a hint from the host in the form of a compression status flag 320 indicating that the associated read data is a good candidate for de-compression by the storage controller as described above in connection with FIG. 7. As yet another example, if it is determined in a manner similar to that described above in connection with FIG. 8, that neither the storage controller nor the host has sufficient resources available, a read request for encrypted data may be accompanied by a hint from the host in the form of a compression status flag 320 indicating that the transfer of the associated read data to the host may be queued by the storage controller until sufficient resources are available for data de-compression at the storage controller or at the host. Alternatively, the storage controller may transfer the requested encrypted read data to the host which may queue the de-compression of the encrypted read data until the host has sufficient resources available.

It is seen from the above that dynamic compression with dynamic multi-stage encryption for a data storage system in accordance with the present description, in one aspect of the present description, preserves end-to-end encryption between a host and a storage controller while compressing data which was received from the host in encrypted but uncompressed form, using MIPs and other processing resources of the storage controller instead of the host. In addition, load balancing for compression and de-compression may be implemented based upon the respective MIPs and processor resources available to the host and storage system, the bandwidth available on the transfer link between the host and storage system, and the cryptographic hardware resources available. Depending upon the relative cost calculated, the system either compresses the data before or after transferring it between the host and storage system or bypasses compression altogether. Similarly, depending upon the relative cost calculated, the system either de-compresses the data before or after transferring it between the host and storage system. In this manner, system performance may be significantly improved in connection with compressing, de-compressing, encrypting, decrypting and de-duplicating data within the system. Other aspects and advantages may be realized, depending upon the particular application.

Figure 9:
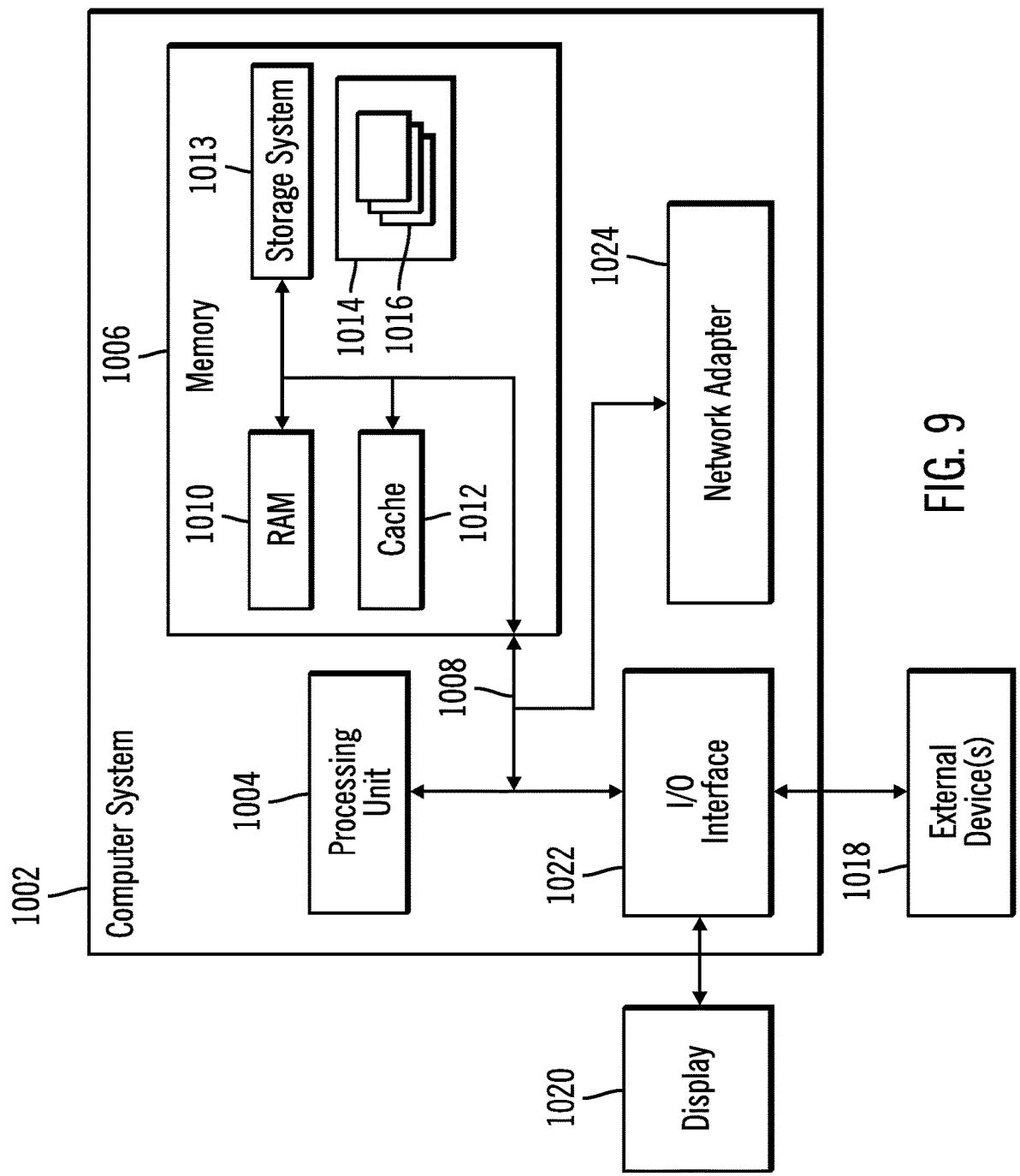
FIG. 9 illustrates a computer embodiment employing dynamic compression with dynamic multi-stage encryption for a data storage system in accordance with the present description.

The computational components of the figures may each be implemented in one or more computer systems, such as the computer system 1002 shown in FIG. 9. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product configured for use with a computer system having a host, and a data storage system having a storage controller and at least one storage device controlled by the storage controller and configured to store data, wherein the computer system has at least one processor, and wherein the computer program product comprises a computer readable storage medium having program instructions embodied therewith, the program instructions executable by a processor of the computer system to cause computer system operations, the computer system operations comprising:

a host transferring encrypted data to a storage controller controlling a storage device; and the storage controller:

receiving a compression status flag associated with the encrypted data from the host and indicating whether an ordered multi-stage series process is to be performed by the storage controller for the encrypted data; and selectively 1) performing on the encrypted data as a function of a state of the compression status flag, the ordered multi-stage series process which includes in the following order:

decrypting the encrypted data to unencrypted data;

compressing the unencrypted data to compressed data;

encrypting the compressed data to encrypted, compressed data; and storing the encrypted, compressed data in the storage device; and 2) bypassing as a function of a state of the compression status flag, the ordered multi-stage series process.

2. The computer program product of claim 1 wherein the decrypting the encrypted data to unencrypted data includes decrypting the encrypted data to unencrypted data in a volatile memory area of the storage controller and securely erasing the volatile memory area in a secure data overwrite process to ensure erasure of unencrypted data resultant from the decrypting.

3. The computer program product of claim 1 wherein selectively performing a multi-stage series process as a function of a state of the compression status flag includes determining by the storage controller as a function of a state of the compression status flag whether to decrypt, compress and encrypt again, the encrypted data received from the host and associated with the compression status flag.

4. The computer program product of claim 3 wherein the compression status flag has a state which indicates at least one of whether encrypted data received from the host and associated with the compression status flag is 1) compressed, and 2) compressible.

5. The computer program product of claim 1 wherein the computer system operations further comprise the storage controller:

receiving a read request from a host to read encrypted data stored in the storage device;

transferring encrypted read data from the storage device to the storage controller;

determining whether the encrypted read data read from the storage device has been compressed, and if so:

decrypting the encrypted read data to unencrypted read data;

de-compressing the unencrypted read data to uncompressed read data;

encrypting the uncompressed read data to encrypted, uncompressed read data; and transferring the encrypted, uncompressed read data to the host.

6. The computer program product of claim 5 wherein the computer system operations further comprise the storage controller storing a compression status tag in association with encrypted data stored in the storage device wherein the compression status tag has a state which indicates whether associated encrypted data stored in the storage device is compressed, and wherein determining whether encrypted read data read from the storage device has been compressed, is a function of the state of the associated compression status tag which indicates whether associated encrypted data stored in the storage device is compressed.

7. The computer program product of claim 1 wherein the computer system operations further comprise the host determining as a function of a comparison of available resources of the host and the storage controller, whether to compress unencrypted data at the host prior to encrypting and transferring encrypted data to the storage controller, and whether to bypass compressing unencrypted data at the host prior to encrypting and transferring encrypted data to the storage controller.

8. A method, comprising:

a host transferring encrypted data to a storage controller controlling a storage device; and the storage controller:

receiving a compression status flag associated with the encrypted data from the host and indicating whether an ordered multi-stage series process is to be performed by the storage controller for the encrypted data; and selectively 1) performing on the encrypted data as a function of a state of the compression status flag, the ordered multi-stage series process which includes in the following order:
  decrypting the encrypted data to unencrypted data;
  compressing the unencrypted data to compressed data;
  encrypting the compressed data to encrypted, compressed data; and
  storing the encrypted, compressed data in the storage device; and
2) bypassing as a function of a state of the compression status flag, the ordered multi-stage series process.

9. The method of claim 8 wherein the decrypting the encrypted data to unencrypted data includes decrypting the encrypted data to unencrypted data in a volatile memory area of the storage controller and securely erasing the volatile memory area in a secure data overwrite process to ensure erasure of unencrypted data resultant from the decrypting.

10. The method of claim 8 wherein selectively performing a multi-stage series process as a function of a state of the compression status flag includes determining by the storage controller as a function of a state of the compression status flag whether to decrypt, compress and encrypt again, the encrypted data received from the host and associated with the compression status flag.

11. The method of claim 10 wherein the compression status flag has a state which indicates at least one of whether encrypted data received from the host and associated with the compression status flag is 1) compressed, and 2) compressible.

12. The method of claim 8 further comprising the storage controller:
  receiving a read request from a host to read encrypted data stored in the storage device;
  transferring encrypted read data from the storage device to the storage controller;
  determining whether the encrypted read data read from the storage device has been compressed, and if so:
    decrypting the encrypted read data to unencrypted read data;
    de-compressing the unencrypted read data to uncompressed read data;
    encrypting the uncompressed read data to encrypted, uncompressed read data; and
  transferring the encrypted, uncompressed read data to the host.

13. The method of claim 12 further comprising the storage controller storing a compression status tag in association with encrypted data stored in the storage device wherein the compression status tag has a state which indicates whether associated encrypted data stored in the storage device is compressed, and wherein determining whether encrypted read data read from the storage device has been compressed, is a function of the state of the associated compression status tag which indicates whether associated encrypted data stored in the storage device is compressed.

14. The method of claim 8 further comprising the host determining as a function of a comparison of available resources of the host and the storage controller, whether to compress unencrypted data at the host prior to encrypting and transferring encrypted data to the storage controller, and whether to bypass compressing unencrypted data at the host prior to encrypting and transferring encrypted data to the storage controller.

15. A computer system, comprising:
a host;
a data storage system having a storage controller and at least one storage device controlled by the storage controller and configured to store data,
wherein at least one of the host and the data storage system of the computer system has at least one processor and a computer program product comprising a computer readable storage medium having program instructions embodied therewith, the program instructions executable by a processor of the computer system to cause computer system operations, the computer system operations comprising:
the host transferring encrypted data to the storage controller controlling the storage device; and
the storage controller:
  receiving a compression status flag associated with the encrypted data from the host and indicating whether an ordered multi-stage series process is to be performed by the storage controller for the encrypted data; and
  selectively 1) performing as a function of a state of the compression status flag, the ordered multi-stage series process which includes in the following order:
    decrypting the encrypted data to unencrypted data;
    compressing the unencrypted data to compressed data;
    encrypting the compressed data to encrypted, compressed data; and
    storing the encrypted, compressed data in the storage device; and
  2) bypassing as a function of a state of the compression status flag, the ordered multi-stage series process.

16. The system of claim 15 wherein the decrypting the encrypted data to unencrypted data includes decrypting the encrypted data to unencrypted data in a volatile memory area of the storage controller and securely erasing the volatile memory area in a secure data overwrite process to ensure erasure of unencrypted data resultant from the decrypting.

17. The system of claim 15 wherein selectively performing a multi-stage series process as a function of a state of the compression status flag includes determining by the storage controller as a function of a state of the compression status flag whether to decrypt, compress and encrypt again, the encrypted data received from the host and associated with the compression status flag.

18. The system of claim 17 wherein the compression status flag has a state which indicates at least one of whether encrypted data received from the host and associated with the compression status flag is 1) compressed, and 2) compressible.

19. The system of claim 15 wherein the computer system operations further comprise the storage controller:
  receiving a read request from a host to read encrypted data stored in the storage device;
  transferring encrypted read data from the storage device to the storage controller;
  determining whether the encrypted read data read from the storage device has been compressed, and if so:
    decrypting the encrypted read data to unencrypted read data;
    de-compressing the unencrypted read data to uncompressed read data;
    encrypting the uncompressed read data to encrypted, uncompressed read data; and
  transferring the encrypted, uncompressed read data to the host.

20. The system of claim 19 wherein the computer system operations further comprise the storage controller storing a compression status tag in association with encrypted data stored in the storage device wherein the compression status tag has a state which indicates whether associated encrypted data stored in the storage device is compressed, and wherein determining whether encrypted read data read from the storage device has been compressed, is a function of the state of the associated compression status tag which indicates whether associated encrypted data stored in the storage device is compressed.

21. The system of claim 15 wherein the computer system operations further comprise the host determining as a function of a comparison of available resources of the host and the storage controller, whether to compress unencrypted data at the host prior to encrypting and transferring encrypted data to the storage controller, and whether to bypass compressing unencrypted data at the host prior to encrypting and transferring encrypted data to the storage controller.

* * * * *